United States Patent
Seo et al.

(10) Patent No.: US 9,100,644 B2
(45) Date of Patent: Aug. 4, 2015

(54) STEREOSCOPIC IMAGE DISPLAY DEVICE AND DRIVING METHOD THEREOF

(75) Inventors: Hae-Kwan Seo, Yongin (KR); Tae-Jin Kim, Yongin (KR); Do-Youb Kim, Yongin (KR); Bon-Seog Gu, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 354 days.

(21) Appl. No.: 13/137,921

(22) Filed: Sep. 21, 2011

(65) Prior Publication Data
US 2012/0113168 A1    May 10, 2012

(30) Foreign Application Priority Data
Nov. 5, 2010  (KR) .......................... 10-2010-0109835

(51) Int. Cl.
*G09G 5/10*   (2006.01)
*H04N 13/04*  (2006.01)
*G09G 3/00*   (2006.01)
*G09G 3/32*   (2006.01)

(52) U.S. Cl.
CPC ........... *H04N 13/0438* (2013.01); *G09G 3/003* (2013.01); *G09G 3/3233* (2013.01); *G09G 2300/0861* (2013.01)

(58) Field of Classification Search
CPC .......... G09G 2300/0861; G09G 3/003; G09G 3/3233; H04N 13/0438
USPC ............. 345/690–691, 89, 213, 7–9, 419, 76, 345/211–212; 349/11, 13, 15; 348/42, 348/51–53; 359/465
See application file for complete search history.

(56) References Cited

U.S. PATENT DOCUMENTS

| | | | |
|---|---|---|---|
| 2007/0229487 A1* | 10/2007 | Slavenburg et al. | 345/213 |
| 2008/0284801 A1* | 11/2008 | Brigham et al. | 345/690 |
| 2010/0066820 A1* | 3/2010 | Park et al. | 348/53 |
| 2010/0188399 A1* | 7/2010 | Shestak et al. | 345/419 |
| 2010/0238274 A1* | 9/2010 | Kim et al. | 348/51 |
| 2010/0245400 A1* | 9/2010 | Nakahata et al. | 345/690 |
| 2011/0007140 A1* | 1/2011 | Nakahata et al. | 348/56 |
| 2011/0074939 A1* | 3/2011 | Ito et al. | 348/58 |
| 2011/0116166 A1* | 5/2011 | Jung et al. | 359/465 |

FOREIGN PATENT DOCUMENTS

| | | |
|---|---|---|
| KR | 10-2008-0055081 A | 6/2008 |
| KR | 10-2008-0066504 A | 7/2008 |
| KR | 10-2010-0052278 A | 5/2010 |
| KR | 10-2010-0083017 A | 7/2010 |

* cited by examiner

*Primary Examiner* — Quan-Zheng Wang
*Assistant Examiner* — Tony Davis
(74) *Attorney, Agent, or Firm* — Lee & Morse, P.C.

(57) ABSTRACT

A stereoscopic image display device includes a scan driver, a data driver, a light emission control driver, a display unit including a plurality of pixels, and a controller controlling the scan driver, the data driver, and the light emission control driver. The controller generates image data signals corresponding to a left-eye image display period, a right-eye image display period, and a black image display period during one frame and supplies the image data signals to the data driver. The black image display period, in which a black image according to the black data signal is displayed, and a shutter stabilization period, in which a left eye glass and a right eye glass of shutter spectacles are opened/closed, overlap each other between the left-eye image display period and the right-eye image display period.

19 Claims, 6 Drawing Sheets

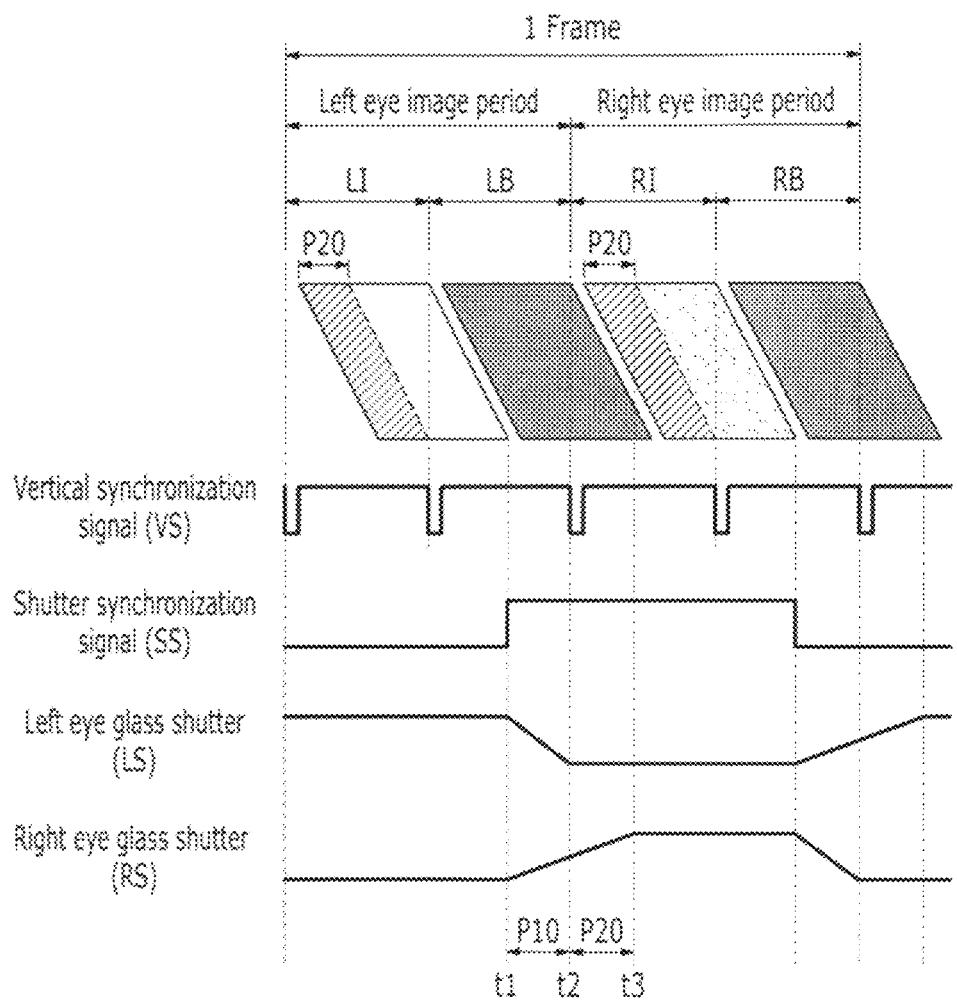

STEREOSCOPIC IMAGE DISPLAY DEVICE AND DRIVING METHOD THEREOF

CROSS-REFERENCE TO RELATED APPLICATION

This application claims priority to and the benefit of Korean Patent Application No. 10-2010-0109835 filed in the Korean Intellectual Property Office on Nov. 5, 2010, and entitled "Stereoscopic Image Display Device and Driving Method Thereof," the entire contents of which are incorporated herein by reference.

BACKGROUND

1. Field

Embodiments relate to a stereoscopic image display device and a driving method thereof.

2. Description of the Related Art

Flat panel displays that are capable of reducing weight and volume, as compared to a cathode ray tube display device, have been developed. The flat panel displays include, e.g., a liquid crystal display LCD), a field emission display (FED), a plasma display panel (PDP), an organic light emitting diode (OLED) display, and the like. For example, the organic light emitting diode display may display images by using organic light emitting diodes (OLED) that may generate light of a predetermined luminance corresponding to a data current supplied from a pixel circuit.

The flat panel displays may be used to display a stereoscopic image, in which at least two images corresponding to at least two different viewing points may be displayed during one frame display period. For examples, stereoscopic image display device may display a left-eye image and a right-eye image.

The above information disclosed in this Background section is only for enhancement of understanding of the background of the invention and therefore it may contain information that does not form the prior art that is already known in this country to a person of ordinary skill in the art.

SUMMARY

Embodiments may be realized by providing a stereoscopic image display device including a scan driver transmitting a plurality of scan signals to a plurality of scan lines; a data driver transmitting a plurality of data signals to a plurality of data lines; a light emission control driver transmitting a plurality of light emission control signals to a plurality of light emission control lines; a display unit including a plurality of pixels connected to a corresponding scan line of a plurality of scan lines, a corresponding data line of a plurality of data lines, and a corresponding light emission control line of a plurality of light emission control lines, wherein the plurality of pixels are transmitted the corresponding data signal when the corresponding scan signal is transmitted; and a controller controlling the scan driver, the data driver, and the light emission control driver and generating image data signals corresponding to a left-eye image display period, a right-eye image display period, and a black image display period during one frame and supplying them to the data driver, wherein a black image display period in which a black image according to the black data signal is displayed and a shutter stabilization period in which a left eye glass and a right eye glass of shutter spectacles are opened/closed overlap each other between the left-eye image display period and the right-eye image display period.

The image according to the left eye image data signal to display the left-eye image or the right eye image data signal to display the right-eye image may not be displayed in the shutter stabilization period.

The shutter stabilization period may overlap a period in which the light emitting of the display unit is off among the black image display period and the left-eye image display period or the right-eye image display period.

The shutter stabilization period may be a period in which the opening/closing of the left eye glass and the right eye glass of the shutter spectacles are intersected, and an opening speed of the shutter spectacles may be slower than a closing speed.

The period in which the light emitting of the display unit is off may accord with a time according to the speed difference that the left eye glass and the right eye glass of the shutter spectacles are intersected with each other and are opened/closed. However, this is only one embodiment, and the light emitting off period of the display unit is not necessarily accorded with the time according to the opening/closing speed difference.

In an exemplary embodiment, the frequency of a plurality of scan signals of the display unit transmitted during the left-eye image display period and the right-eye image display period may be higher than a sub-frame frequency of the left-eye image display period or the right-eye image display period.

The frequency of a plurality of scan signals of the display unit transmitted during the left-eye image display period and the right-eye image display period may be 1.25 times to 2 times the sub-frame frequency of the left-eye image display period or the right-eye image display period. However, it is not limited to the embodiment.

The black image display period may be started at a time that the left-eye image display period and the right-eye image display period are respectively finished.

Also, the light emission control driver may generate and transmit a light emission control signal blocking the light emitting of the corresponding pixel among the plurality of pixels during the same time as the time according to the speed difference that the left eye glass and the right eye glass of the shutter spectacles are intersected and opened/closed among the left-eye image display period or the right-eye image display period.

A duty ratio of the plurality of light emission control signals may be adjusted according to the shutter reaction speed of the shutter spectacles.

The plurality of light emission control signals may be transmitted as a gate on voltage level in synchronization with the time that the opening/closing of the left eye glass and the right eye glass of the shutter spectacles are intersected.

The scan driver may transmit a plurality of scan signals of a higher frequency than the sub-frame frequency of the left-eye image display period or the right-eye image display period.

The frequency of a plurality of scan signals may be 1.25 times to 2 times the sub-frame frequency of the left-eye image display period or the right-eye image display period.

A method for driving a stereoscopic image display device according to an exemplary embodiment includes driving a plurality of pixels with one frame including sub-frames of a left-eye image display period, a right-eye image display period, and a black image display period inserted between the left-eye image display period and the right-eye image display period. In detail, the driving method according to an exemplary embodiment includes generating a left eye image data signal, a right eye image data signal, and a black image data signal corresponding to the left-eye image display period, the right-eye image display period, and the black image display period with a sequence of the sub-frame; light-emitting a plurality of pixels according to the left eye image data signal; displaying a black image with a plurality of pixels according to the black image data signal; light-emitting a plurality of pixels according to the right eye image data signal; and displaying a black image with a plurality of pixels according to the black image data signal, wherein each light emitting of the plurality of pixels is off during an initial predetermined period of the light-emitting according to the left eye image data signal and the right eye image data signal.

A period including the predetermined period and the portion of the black image display period before the predetermined period may be a shutter stabilization period in which a left eye glass and a right eye glass of shutter spectacles are opened/closed.

An image according to the left eye image data signal to display the left-eye image or the right eye image data signal to display the right-eye image may not be displayed in the shutter stabilization period. That is, the images according to the left eye image data signal and the right eye image data signal are not displayed together.

The shutter stabilization period may be a period in which the opening/closing of the left eye glass and the right eye glass of the shutter spectacles are intersected, and an opening speed of the shutter spectacles is slower than a closing speed.

The predetermined period may accord with a time according to the speed difference that the left eye glass and the right eye glass of the shutter spectacles are intersected to each other and are opened/closed.

The scan speed for a plurality of pixels during the left-eye image display period and right-eye image display period may be faster than a sub-frame frequency of the left-eye image display period or the right-eye image display period, however it is not limited thereto, and the scan speed may be 1.25 times to 2 times the sub-frame frequency of the left-eye image display period or the right-eye image display period.

The plurality of pixels may not be light-emitted corresponding to a light emission control signal controlling a switching operation of a light emission control transistor controlling the light emitting of an organic light emitting diode (OLED) included in the plurality of pixels during the predetermined period. The duty ratio of the light emission control signal may be adjusted according to the shutter reaction speed of the shutter spectacles, and the light emission control signal may be transmitted as a gate on voltage level in synchronization with the time that the opening/closing of the left eye glass and the right eye glass of the shutter spectacles are intersected.

According to an exemplary embodiment, in the display device driving the stereoscopic image, the crosstalk generated by the mixture of the left-eye image and the right-eye image is completely removed such that a clear 3D stereoscopic image may be realized.

BRIEF DESCRIPTION OF THE DRAWINGS

Features will become apparent to those of ordinary skill in the art by describing in detail exemplary embodiments with reference to the attached drawings in which:

FIG. 6 illustrates a frame diagram and a driving waveform showing a driving method of a stereoscopic image display device according to an exemplary embodiment.

DETAILED DESCRIPTION

Figure 1:
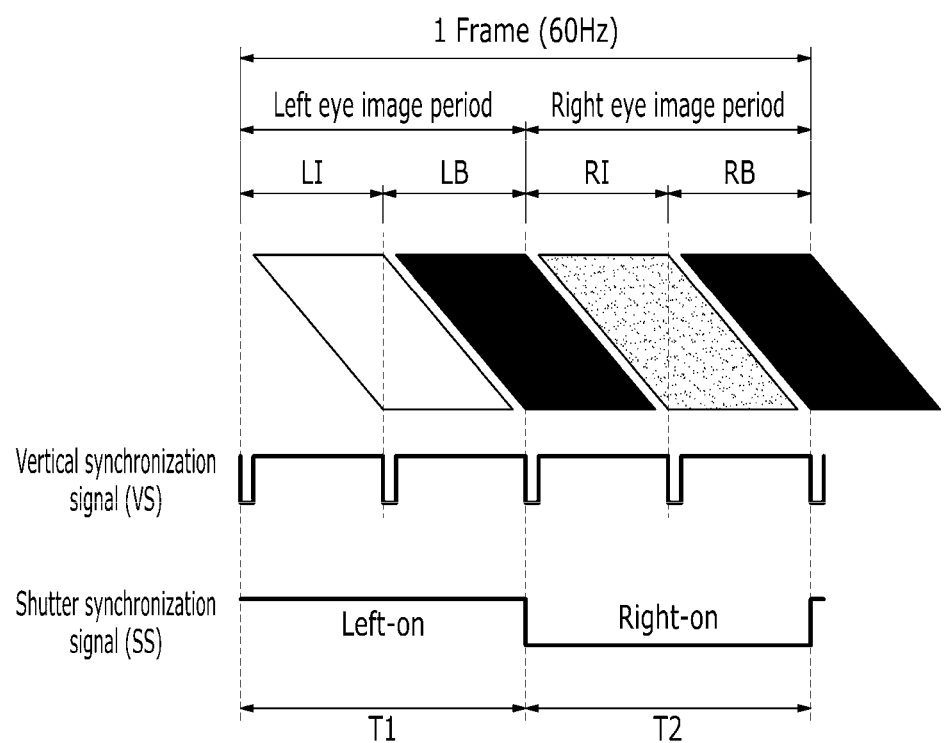
FIG. 1 illustrates a frame diagram and a driving waveform of an exemplary driving method of a stereoscopic image display device.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Further, in the exemplary embodiments, like reference numerals designate like elements throughout the specification representatively in a first exemplary embodiment, and only elements other than those of the first exemplary embodiment will be described for subsequent embodiments.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a frame diagram and a driving waveform showing a driving method of a stereoscopic image display device. Particularly, a realization method of a 3D stereoscopic image that is realized during one frame in a stereoscopic image display device according to a field sequential driving method is shown in FIG. 1.

Referring to FIG. 1, one frame may be driven at 60 Hz among a 3D driving method, and each sub-frame may be driven at 240 Hz. That is, when 3D-driving a display panel of a sequential driving method, one frame is divided into a left-eye image period and a right-eye image period that are respectively divided into a corresponding image display period and a black image display period as two sub-frames. For example, the left-eye image period includes a left-eye image display period LI in which the left-eye image is displayed and a black image display period LB in which the black image is displayed. The right-eye image period includes a right-eye image display period RI in which the right-eye image is displayed and a black image display period RB in which the black image is displayed.

According to the embodiment of FIG. 1, the left-eye image display period LI, the black image display period LB, the right-eye image display period RI, and the black image display period RB are driven at 240 Hz. However, this is only an example, and is not limited to a driving frequency such that it is possible to be driven with a low speed.

In the 3D stereoscopic image system, to realize the 3D stereoscopic image, stereoscopic image shutter spectacles may be used to recognize the left-eye image and the right-eye image corresponding to the display panel displaying the left-eye image and the right-eye image.

For example, the shutter spectacles may open the left eye corresponding to a shutter synchronization signal SS and simultaneously close the right eye in the left-eye image period. The shutter spectacles may open the right eye corresponding to the shutter synchronization signal SS and simultaneously close the left eye in the right-eye image period. Therefore, the left eye of the shutter spectacles may have an opened/closed relationship with the right eye of the shutter spectacles. Opened/closed relationship refers to the one, e.g., the left eye, being opened when the other, e.g., the right eye, is being closed.

According to the above 3D stereoscopic image system, the left-eye image may be displayed at the left-eye image display period LI and the black image may be displayed at the black image display period LB among the left-eye image period T1 in which the left eye is opened. The left-eye image and the black image may be sequentially recognized by the opened left eye of the shutter spectacles. The right-eye image may be displayed at the right-eye image display period LI and the black image may be displayed at the black image display period RB among the right-eye image period T2 in which the right eye is opened. The right-eye image and the black image may be sequentially recognized by the opened right eye of the shutter spectacles.

The left-eye image display period LI, the right-eye image display period RI, and the black image display periods LB and RB may be started by a vertical synchronization signal VS. For example, the display panel of the stereoscopic image display device may be scanned by a plurality of scan signals sequentially activating a plurality of pixel lines of the display panel corresponding to the vertical synchronization signal VS.

A scan signal corresponding to a plurality of scan lines of the display panel may be transmitted. A plurality of pixels connected to the scan line that is transmitted with the scan signal may be displayed with a predetermined grayscale corresponding to the left eye image data signal, the right eye image data signal, or the black data signal.

According to the stereoscopic image display device shown in FIG. 1, the left-eye image display period LI, the right-eye image display period RI, and the black image display periods LB and RB form one frame such that the stereoscopic image display device is driven at 240 Hz to display a stereoscopic image in one frame. In another stereoscopic image display device similar to the device shown in FIG. 1, the left-eye image display period LI and the right-eye image display period RI may be driven with a low speed of about 120 Hz.

The black image may be displayed to be recognized after the period in which the left-eye image or the right-eye image is recognized, such that the left-eye image and the right-eye image are displayed together at the time when the shutter spectacles are opened to recognize the left-eye image and the right-eye image, to thereby prevent the crosstalk. In a case of the low speed of about 120 Hz, the lower display of the left-eye image and the upper display of the right-eye image may be performed at the same time such that the crosstalk may be further serious even though the black image is inserted between the left-eye image and the right-eye image display period.

Like the exemplary embodiment of FIG. 1, the crosstalk in which the left-eye image and the right-eye image are displayed together may still be generated at the time that the left-eye image period T1 in which the left eye of the shutter spectacles is opened is finished and the right-eye image period T2 in which the right eye of the shutter spectacles is opened is started in the 3D driving method inserting the black image.

That is, at the time that the left-eye image period T1 is finished, although the sub-frame displaying the black image is inserted between the sub-frame in which the left-eye image is displayed and the sub-frame in which the right-eye image is displayed, the lower portion of the left-eye image and the upper portion of the right-eye image accord in time. Accordingly, when considering the reaction speed of the shutter spectacles, the right-eye image is recognized at the left eye during the time that the spectacles shutter of the left-eye showing the left-eye image is closed such that the crosstalk may be recognized.

Embodiments may effectively improves the driving method of the stereoscopic image display device to substantially, e.g., completely, remove the crosstalk that may still be generated while using the 3D driving method for improving the crosstalk.

A driving method of a stereoscopic image display device according to an exemplary embodiment will be described with reference to FIG. 2 to FIG. 6.

Figure 2:
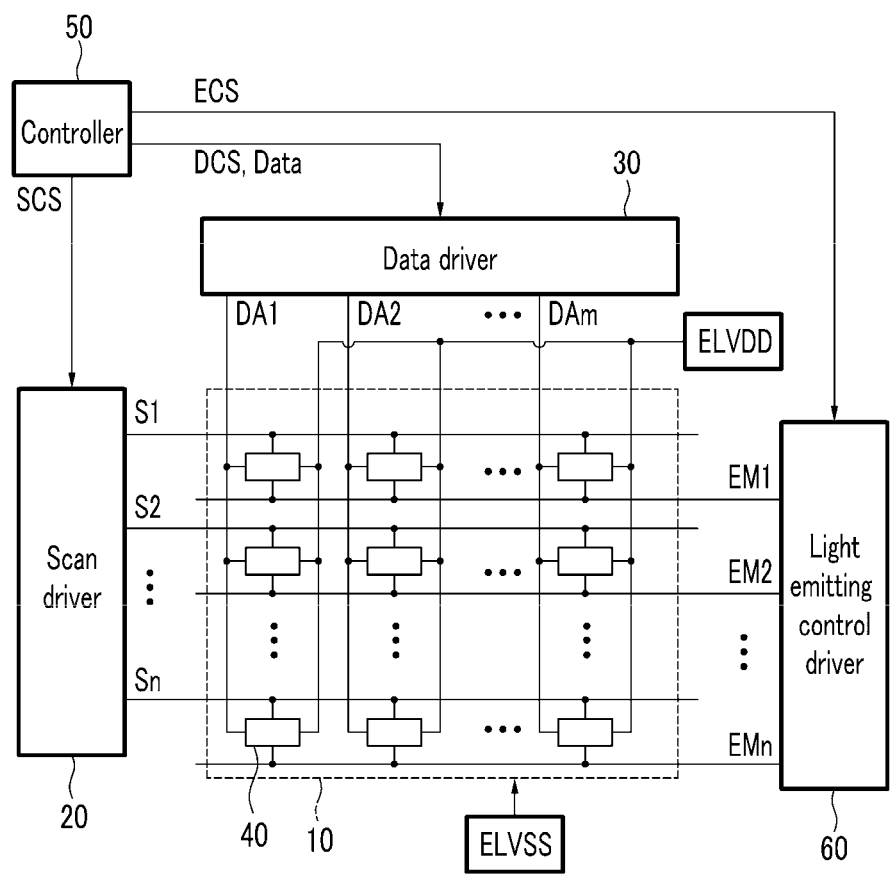
FIG. 2 illustrates a block diagram of a stereoscopic image display device according to an exemplary embodiment.

FIG. 2 is a block diagram of a stereoscopic image display device according to an exemplary embodiment.

Referring to FIG. 2, a display device according to an exemplary embodiment may include a display unit 10 having therein a plurality of pixels PX. The pixels PX may be connected to scan lines S1 to Sn, data lines DA1 to DAm, and light emission control lines EM1 to EMn. The display device may include a scan driver 20, e.g., for generating and supplying a scan signal to the scan lines S1 to Sn. The display device may include a data driver 30, e.g., for supplying an image data signal according to a video signal input from the external to the data lines DA1 to Dam. The display device may include a light emission control driver 60, e.g., for generating and supplying a light emission control signal to the light emission control lines EM1 to EMn. The display device may also include a controller 50 for controlling the scan driver 20, the data driver 30, and the light emission control driver 60.

The controller 50 may generate a data driving control signal DCS, a scan driving control signal SCS, and a light emitting driving control signal ECS corresponding to synchronization signals supplied from the external. The data driving control signal DCS generated in the controller 50 may be supplied to the data driver 30, the scan driving control signal SCS may be supplied to the scan driver 20, and the light emitting driving control signal ECS may be supplied to the light emission control driver 60.

The controller 50 may convert a video signal IS into an image data signal DATA and supply the image data signal DATA to the data driver 30.

The stereoscopic image display device according to an exemplary embodiment sequentially displays the left-eye image and the right-eye image corresponding to the respective left and right eyes to display the stereoscopic image. To respectively transmit the left-eye image and the right-eye image to both eyes, an additional set of shutter spectacles may be required.

For example, the viewer may wear the spectacles for the image to be projected during the period in which the left-eye image is displayed to only the left eye and for the image to be projected during the period in which the right-eye image is displayed to only the right eye.

For this stereoscopic image display device, the image data signal DATA supplied from the controller 50 to the data driver 30 may include a left eye image data signal and a right eye image data signal. The left eye image data signal may be the image data signal for the image to be transmitted to the left eye of the user and may be recognized though a left eye glass (a left eye unit) of the shutter spectacles. The right eye image data signal may be the image data signal for the image to be transmitted to the right eye of the user and may be recognized though a right eye glass (a right eye unit) of the shutter spectacles.

The data driver 30 may supply a plurality of image data signals to a plurality of data lines DA1 to DAm at the sub-frame corresponding to the left-eye image display period and the right-eye image display period among a plurality of sub-frames included in one frame. The data driver 30 may supply a plurality of left eye image data signals and a plurality of right eye image data signals that are transmitted according to the data driving control signal transmitted from the controller 50 to a plurality of data lines.

The controller 50 may generate and transmit the image data signal as the black image data signal during a predetermined period between the left-eye image display period and the right-eye image display period. The predetermined period may be a black image display period. The black image data signal is the image data signal for light not to be emitted, that is, the current is not supplied to the organic light emitting diode (OLED).

The data driver 30 may transmit a plurality of black data signals to a plurality of data lines according to the data driving control signal DCS. The data driver 30 may transmit a plurality of image data signals to a plurality of pixels 40 through a plurality of data lines in synchronization with a time that a scan signal has a gate on voltage corresponding to each sub-frame. The gate on voltage means the level turning on the switching transistor for the image data signal to be transmitted to the gate electrode of the driving transistor transmitting the driving current to the organic light emitting diode (OLED) included in the pixel. This is described with reference to a pixel structure of FIG. 3.

In the left-eye image display period, a plurality of left eye image data signals may be transmitted through a plurality of data lines, and in the right-eye image display period, a plurality of right eye image data signals may be transmitted. A plurality of black data signals may be transmitted in the black image display period.

The scan driver 20 may supply the scan signal having the gate on voltage to the corresponding scan line among a plurality of scan lines S1 to Sn in synchronization with a starting point of each sub-frame. A plurality of pixels 40 connected to the scan line supplied with the scan signal having the gate on voltage among a plurality of scan lines S1 to Sn may be selected and activated. A plurality of pixels 40 selected by the scan signal may receive one of the left eye image data signal, the right eye image data signal, and the black data signal from a plurality of data lines DA1 to DAm.

The frequency of the scan signal may be controlled by the scan control signal SCS. The scan driver 20 may supply a plurality of scan signals as a sub-frame unit according to the scan control signal SCS, and may transmit a plurality of scan signals to the corresponding to scan lines. For example, the scan control signal SCS may include a vertical synchronization signal (referring to FIG. 4) dividing a plurality of sub-frames and a horizontal synchronization signal determining a transmitting time of a plurality of scan signals.

The light emission control driver 60 may control the light emitting of a plurality of pixels included in the display unit 10 according to the image data signal corresponding to the light emitting driving control signal ECS transmitted from the controller 50. The light emission control driver 60 may generate and transmit the light emission control signal to the light emission control lines EM1 to EMn connected to a plurality of pixels corresponding to the light emission control driving signal ECS. The driving of the pixels, e.g., the organic light emitting diode (OLED) included in each pixel, may be controlled corresponding to the driving timing of the light emission control signal. For example, if the light emission control signal is applied to the plurality of pixels as the gate on voltage level, the organic light emitting diode (OLED) may emit light with the driving current according to the image data signal to display the image. If the light emission control signal is applied as the gate off voltage level, the current supplied to the organic light emitting diode (OLED) may be blocked such that the organic light emitting diode (OLED) does not emit light. The stereoscopic image display device may include the light emission control driver according to the structure of the pixel.

The first power source ELVDD and the second power source ELVSS may supply two driving voltages to operate the plurality of pixels 40. The two driving voltages may include the first driving voltage of a high level supplied from the first power source ELVDD and the second driving voltage of the low level supplied from the second power source ELVSS.

Figure 3:
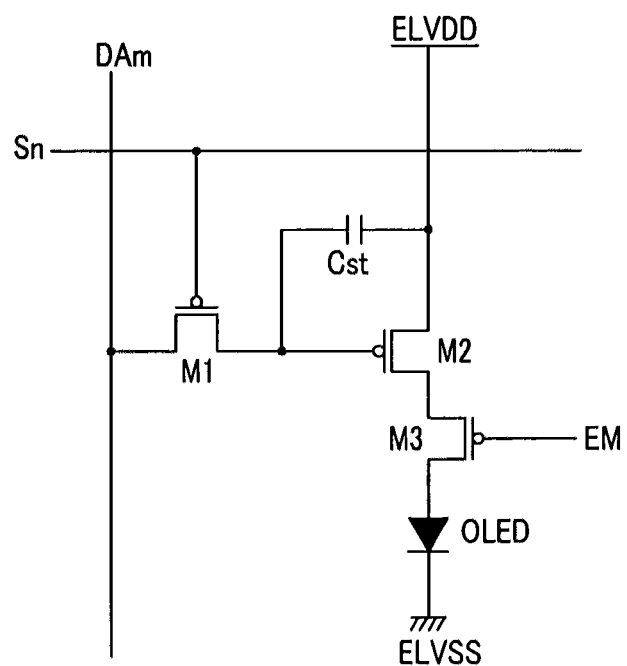
FIG. 3 illustrates a circuit diagram of a configuration of a pixel circuit of the stereoscopic image display device of FIG. 2.

Next, driving of a plurality of pixels of the stereoscopic image display device will be described with reference to a circuit diagram of FIG. 3 showing the configuration of the pixel circuit of the stereoscopic image display device of FIG. 2.

FIG. 3 is a circuit diagram of a corresponding pixel 40 among a plurality of pixels included in the stereoscopic image display device of FIG. 2.

Referring to FIG. 3, the pixel 40 may include a switching transistor M1, a driving transistor M2, a light emission control transistor M3, a storage capacitor Cst, and an organic light emitting diode OLED. FIG. 3 illustrates one exemplary embodiment of the driving circuit of the pixel, however this structure is not limited and the structure of the pixel circuit disclosed in the art may be variously applied.

The pixel 40, according to the exemplary embodiment of FIG. 3, may include a switching transistor M1 having a gate connected to the corresponding scan line among the plurality of scan lines, a source connected to the corresponding data line among the plurality of data lines, and a drain connected to a node connected to one terminal of the storage capacitor Cst and a gate of the driving transistor M2.

The pixel 40 may include the driving transistor M2 having the gate connected to the drain of the switching transistor M1, a source connected to the first power source ELVDD, and a drain connected to a source of the light emission control transistor M3.

Further, the pixel 40 may include the light emission control transistor M3 including a gate connected to a light emission control line EM, a source connected to the drain of the driving transistor M2, and the drain connected to an anode of the organic light emitting diode OLED.

The storage capacitor Cst may include one terminal connected to the node connected to the drain of the switching transistor M1 and the gate of the driving transistor M2. The storage capacitor Cst may include another terminal connected to the source of the driving transistor M2, thereby maintaining a voltage difference between the gate and the source of the driving transistor M2 during a predetermined sub-frame period in which the image is displayed.

The anode of the organic light emitting diode (OLED) may be connected to the drain of the light emission control transistor M3, and the cathode thereof may be connected to the second power source ELVSS.

When the switching transistor M1 is turned on according to the scan signal transmitted through the corresponding scan line, the data signal transmitted through the turned-on switching transistor M1 may be transmitted to the gate of the driving transistor M2. Accordingly, the voltage difference between the gate and the source of the driving transistor M2 may be the first driving voltage of the data signal and the first power source ELVDD, and the driving current may flow in the driving transistor M2 according to the corresponding voltage difference.

The driving current may be transmitted to the organic light emitting diode (OLED), and the organic light emitting diode (OLED) may emit the light according to the transmitted driving current.

If the plurality of scan signals having the gate on voltage level are supplied to the corresponding scan line of the plurality of scan lines S1 to Sn, the plurality of switching transistors M1 connected to the corresponding scan lines may be turned on. The plurality of data lines DA1 to DAm may respectively receive one of the left eye data signal, the right eye data signal, and the black data signal in synchronization with the time when the scan signal having the gate on voltage is supplied.

One image data signal of the left eye image data signal, the right eye image data signal, and the black image data signal transmitted to the plurality of data lines DA1 to Dam through the turned-on plurality of switching transistors M1 may be transmitted to the driving transistor M2 of the plurality of pixels 40 such that each organic light emitting diode (OLED) of the plurality of pixels 40 executes the light emitting or the non-light emitting during the corresponding sub-frame period according to the transmitted image data signal.

Although one image data signal among the left eye image data signal, the right eye image data signal, and the black data signal may be transmitted, to supply the corresponding driving current to the organic light emitting diode (OLED) may depend on the driving of the light emission control transistor M3. That is, when the light emission control signal transmitted through the light emission control line EM connected to the light emission control transistor M3 is transmitted as the gate on voltage level for being turned on, the organic light emitting diode (OLED) may emit the light with the driving current according to the corresponding image data signal, thereby displaying the image. If the light emission control signal is transmitted as the gate off voltage level such that the light emission control transistor M3 is turned off, the organic light emitting diode (OLED) may not emit the light with the driving current according to the image data signal.

Figure 4:
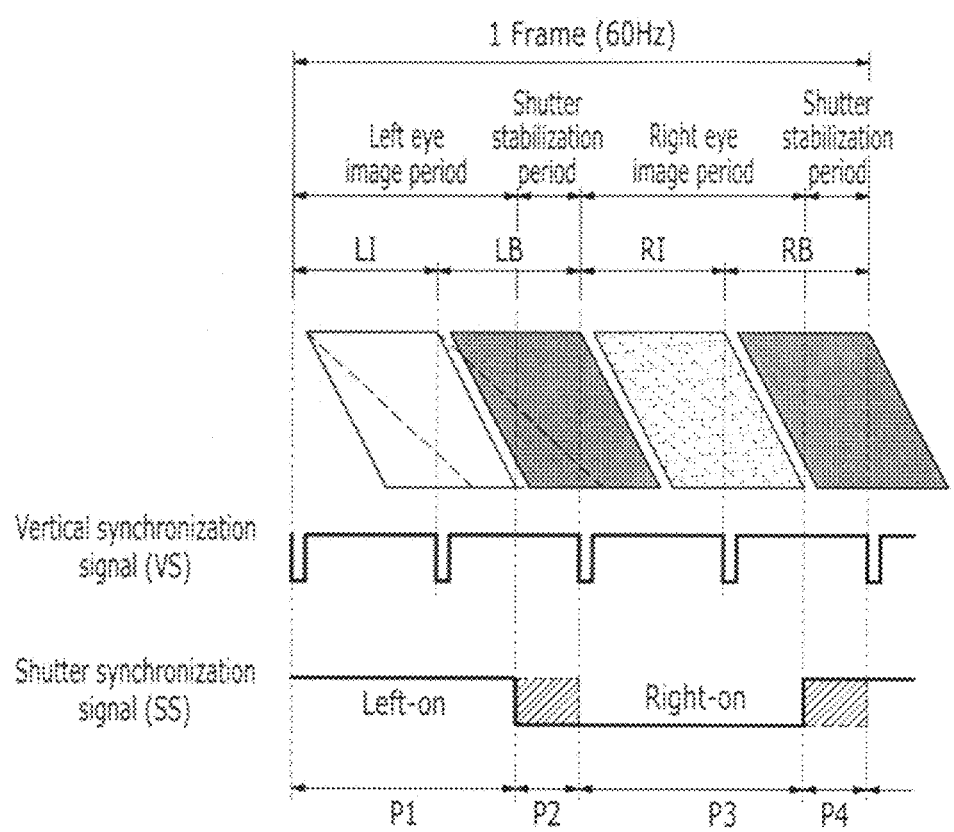
FIG. 4 illustrates a frame diagram and a driving waveform of a driving method of a stereoscopic image display device according to an exemplary embodiment.

FIG. 4 is a view showing a driving method of a stereoscopic image display device according to an exemplary embodiment to substantially, e.g., completely, remove the crosstalk generated in the driving process of the stereoscopic image display device of the FIG. 1. According to the exemplary embodiment of FIG. 4, one frame of the stereoscopic image display device may include four sub-frames, and the frame frequency may be about 60 Hz.

The black image display period may be positioned between the left-eye image display period and the right-eye image display period. Accordingly, the left-eye image display period and the right-eye image display period according to an exemplary embodiment may be predetermined as a period shorter than half of one frame period.

The left-eye image period and the right-eye image period according to an exemplary embodiment shown in FIG. 4 may respectively include a left-eye image display period LI and a black image display period LB, and a right-eye image display period RI and a black image display period RB.

One frame may include a sum period of the left-eye image display period LI and the black image display period LB and a sum period of the right-eye image display period RI and the black image display period RB. The sub-frame frequency may be about 240 Hz.

The driving period of the shutter spectacles may include a left-eye image period, a right-eye image period, and shutter stabilization periods P2 and P4.

The shutter stabilization periods P2 and P4 may overlap the corresponding black image display periods LB and RB. The driving frequency of the respective left-eye image period and the right-eye image period including the shutter stabilization periods may be about 120 Hz.

The stereoscopic image display device, e.g., according to FIG. 4, may start the left-eye image display period LI, the black image display period LB, the right-eye image display period RI, and the black image display period RB corresponding to the vertical synchronization signal VS. These display periods may form one frame according to the embodiment, such that the frequency of the vertical synchronization signal VS may be 240 Hz.

According to an exemplary embodiment, if a plurality of scan signals are sequentially activating, a plurality of pixel lines of the display panel corresponding to the vertical synchronization signal VS may be transmitted to a plurality of scan lines of the display panel of the stereoscopic image display device. A plurality of pixels connected to the scan lines may emit the light according to the transmitted image data signals and may be displayed with the grayscale according to the corresponding image data signal.

In an exemplary embodiment, the speed that a plurality of scan signals transmitted corresponding to the vertical synchronization signal VS are transmitted to the corresponding scan lines may be increased. That is, the frequency of the horizontal synchronization signal may be increased.

The increasing degree of the frequency of the horizontal synchronization signal may be determined according to, e.g., the shutter stabilization periods P2 and P4. As the shutter stabilization periods P2 and P4 are longer, the frequency of the horizontal synchronization signal may be increased. That is, the speed at which a plurality of scan signals are transmitted to the corresponding to scan lines may be increased.

The shutter stabilization periods P2 and P4 may be changed according to the performance of the shutter spectacles such that they may be changed according to the setup of the user. The user may input the shutter stabilization periods P2 and P4 to the stereoscopic image display device, and the stereoscopic image display device may determine the scan signal transmission speed corresponding to the shutter stabilization periods P2 and P4, that is, e.g., the horizontal synchronization signal frequency.

Accordingly, the scan speed of the scan signal to supply the left eye image data, the black image data, and the right eye image data corresponding to the activated vertical synchronization signal VS to each pixel of the display panel may be equally increased. Therefore, the angle of the sub-frame in which the left eye image data, the black image data, and the right eye image data are transmitted and displayed to the display panel may be increased more than the angle of the sub-frame that is displayed in the driving method of FIG. 1 with reference to the horizontal direction.

In an exemplary embodiment, the scan signal may be transmitted in synchronization with the vertical synchronization signal VS that is transmitted at the starting point of the left-eye image display period LI, the black image display period LB transmitted to the left eye, the right-eye image display period RI, and the black image display period RB transmitted to the right eye, and the transmission speed of the scan signal may be the same. Here, the scan speed of the display panel may be transmitted with the frequency higher than four times the frequency of one frame. Preferably, the scan may be performed with the high frequency of more than four times and less than eight times one frame frequency.

In detail, in the exemplary embodiment of the FIG. 4, the display panel may be scanned with the higher frequency than about 240 Hz, e.g., with the frequency of about 300 Hz to about 480 Hz.

Thus, as shown in FIG. 4, the left-eye image display period indicated by a dotted line according to the conventional driving method may be changed into the left-eye image display period LI indicated by the solid line. According to the driving method of an exemplary embodiment, a temporal gap may be formed between the left-eye image display period LI and the right-eye image display period RI such that the right-eye image may not be, e.g., may never be, recognized by the left eye of the user during the time that the left-eye image is transmitted to the left eye of the user. The temporal gap may correspond to the shutter stabilization periods P2 and P4 in FIG. 4. For example, the portion where the lower portion of the left-eye image recognized by the left eye of the user and the upper portion of the right-eye image recognized by the right eye of the user overlap each other substantially disappears because of the shutter stabilization period. As such the crosstalk generated by the mixture of the left-eye image and the right-eye image may be substantially, e.g., completely, removed.

In the stereoscopic image display device, the shutter stabilization period P2 of the shutter spectacles synchronized with the time that the left-eye image display period LI is finished and the shutter stabilization period P4 synchronized with the time that the right-eye image display period RI is finished may overlap the black image insertion period of the stereoscopic image display device. Accordingly, the right-eye image may not be, e.g., is never, inserted in the left-eye period P1 in which the left-eye image is displayed. As such, the crosstalk may be minimized, reduced, and/or prevented.

According to an exemplary embodiment, the shutter synchronization signal SS controlling the right/left opening/closing of the shutter spectacles may be transmitted as the high level in the period P1 of the left-eye image period to open the left eye unit shutter and simultaneously close the right eye unit shutter. The shutter synchronization signal SS may be transmitted as the low level in the period P3 of the right-eye image period to open the right eye unit shutter and to simultaneously close the left eye unit shutter. The shutter synchronization signal SS may be generated in the controller 50 and may be transmitted to the shutter spectacles through a communication unit communicating with the shutter spectacles; however, it is not limited to the exemplary embodiment. The shutter synchronization signal SS may correspond to a cycle of the left-eye image period or the right-eye image period.

The shutter stabilization period P2 provided between the period P1 of the left-eye image period in which the left eye is opened and the period P3 of the right-eye image period in which the right eye is opened may be the period in which the left eye unit (or the left eye glass shutter) is closed and simultaneously the right eye unit (or right eye glass shutter) is opened. The image recognized by the left eye unit or the right eye unit of the opened shutter spectacles during this period may be the black image such that the left-eye and right-eye images are not mixed but may be substantially, e.g., completely, divided. Also, the right eye unit shutter may be closed and simultaneously the left eye unit shutter may be opened in the shutter stabilization period P4 provided between the period P3 in which the right eye is opened and a period (not shown) in which the left eye is opened.

The possibility that the left-eye image and the right-eye image are displayed together may be substantially, e.g., completely, removed during the shutter stabilization periods P2 and P4.

In the image display device according embodiments, the black image display period may be inserted between the left-eye image display period LI and the right-eye image display period RI such that the right and left images may be divided. Simultaneously, the scan speed of the display panel may be controlled while considering the reaction speed of the right/left opening/closing of the shutter spectacles, and thereby the overlapping of the right/left images that is generated in the liquid crystal on/off process of the shutter glass may be minimized, reduced, and/or prevented.

The stabilization periods P2 and P4 of the shutter spectacles is not limited. According to an exemplary embodiment, the stabilizer periods P2 and P4 may be in a range of about 0.5 to about 2.5 ms.

The driving method of the stereoscopic image display device according to the embodiment illustrated in FIG. 4, as compared with the driving method of the stereoscopic image display device illustrated in FIG. 1, may increase the scan signal transmission speed that a plurality of scan signals may be transmitted to the corresponding scan lines while considering the reaction speed of the shutter spectacles. Thus, the shutter stabilization period of the shutter spectacles overlapping the black image display period that is inserted between the finishing point of the left-eye image display period and the starting point of the right-eye image display period may be provided such that the insertion amount of the black image is reduced. Thereby, the luminance influence may be relatively reduced when the left-eye image or the right-eye image is displayed. A detailed comparison according thereto will be described from a configuration of FIG. 5.

Figure 5:
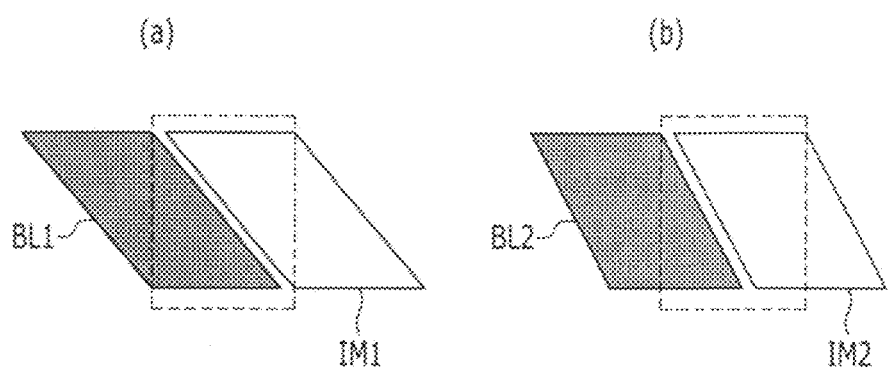
FIG. 5 illustrates a view comparing a black image that is displayed according to driving methods of respective stereoscopic image display devices of FIG. 1 and an exemplary embodiment.

Referring to FIG. 5, a period in which a black image is inserted during a time that an image according to an image data signal is displayed under 3D driving according to FIG. 1 is compared with the exemplary embodiment, e.g., of FIG. 4, that includes a shutter stabilization period. FIG. 5 (a) shows a portion of a 3D driving process according to FIG. 1, and FIG. 5 (b) shows a portion of a 3D driving process according to an exemplary embodiment.

A portion indicated by a dotted line in FIG. 5 indicates the same sub-frames IM1 and IM2 that the left-eye image or the right-eye image is displayed in a plurality of pixels according to the sequential scan of while display panel. The portion indicated by the dotted line is predetermined as the same sub-frame period to compare FIG. 1 and exemplary embodiments.

When the insertion amount of the black image that is inserted in the previous sub-frame periods BL1 and BL2 during the sub-frame period IM1 and IM2 of the same image display is shown, the insertion amount of the black image of FIG. 5 (a) is remarkably larger than the insertion amount of the black image of FIG. 5 (b) showing the 3D driving according to an exemplary embodiment.

According to the 3D driving shown in FIG. 5 (a), when displaying the left-eye image or the right-eye image, the loss of the luminance is generated at about 50% by the black image that is inserted during the previous sub-frame. Also, if the luminance loss according to the glass transmittance of the shutter spectacles is considered, it may be confirmed that the expression of grayscales according to the image data signal is difficult.

In contrast, according to the 3D driving of an exemplary embodiment shown in FIG. 5 (*b*), the black image displayed in the previous sub-frame that is inserted during the same image display period is relatively smaller. As such, the luminance emitted according to the image data signal is relatively smaller. Accordingly, by the 3D driving according to an exemplary embodiment, the loss of the luminance is small as shown in FIG. 5 (*b*) such that the luminance for the image display may be improved.

FIG. 6 is a frame diagram and a driving waveform showing a driving method of a stereoscopic image display device according to another exemplary embodiment.

Referring to FIG. 6, one frame may include a left-eye image period in which the left-eye image is realized and a right-eye image period in which the right-eye image is realized.

The left-eye image period may be a period in which the left eye shutter is opened in the shutter spectacles and the right-eye image period may be a period in which the right eye shutter is opened.

The left-eye image period may overlap a left-eye image display period LI in which the left-eye image according to the left eye image data signal is displayed and a black image display period LB in which the black image is displayed in the stereoscopic image display device. The right-eye image period may overlap a right-eye image display period RI in which the right-eye image according to the right eye image data signal is displayed and a black image display period RB in which the black image is displayed in the stereoscopic image display device.

Accordingly, there is a period in which the opening/closing of the left eye glass shutter and the right eye glass shutter is intersected between the left-eye image period and the right-eye image period, and it will be described later.

According to the exemplary embodiment of FIG. 6, a plurality of scan signals that are transmitted to the plurality of corresponding scan lines connected to a plurality of pixels of the display panel may be transmitted, e.g., at a high speed, during the sub-frame in which the image is displayed corresponding to the vertical synchronization signal VS.

The starting point of the left-eye image display period LI, the black image display period LB, the right-eye image display period RI, and the black image display period RB may be synchronized with the vertical synchronization signal VS. A plurality of scan signals transmitted to the corresponding scan lines among the plurality of scan lines included in the display panel may be transmitted at a high speed corresponding to the vertical synchronization signal VS. That is, the frequency of the horizontal synchronization signal may be increased.

The frequency of a plurality of scan signals may be a higher frequency than four times the frequency of one frame driving. For example, when one frame driving frequency is about 60 Hz, the driving frequency of the left-eye image display period LI, the black image display period LB, the right-eye image display period RI, and the black image display period RB may be about 240 Hz, and the plurality of scan signals may have a frequency higher than 240 Hz. They may be transmitted to a plurality of scan lines connected to a plurality of pixels of the display panel at about 300 Hz to about 480 Hz.

On the other hand, two sub-frames in which the left-eye image and the right-eye image are displayed may form one frame, and in this case, the driving frequency of the sub-frame may be two times one frame driving frequency. That is, in the above example, one sub-frame may be driven at 120 Hz such that the image may be relatively displayed at a low speed. In this case, the transmission speed of a plurality of scan signals transmitted to a plurality of scan lines connected to a plurality of pixels of the display panel, that is, the horizontal synchronization signal frequency, has the higher speed than the sub-frame driving frequency. Therefore, the left-eye image and the right-eye image may be displayed such that the crosstalk may not be generated.

When the stereoscopic image display device, according to an exemplary embodiment, is the low speed in which two sub-frames are driven, the vertical synchronization signal VS may be transmitted with the on voltage level at the starting point of the left-eye image period and the right-eye image period to start the scan operation of the display panel.

According to the exemplary embodiment of FIG. 6, a plurality of pixels of the display panel may be activated and displayed according to the image data signal, e.g., by a plurality of scan signals transmitted at the high speed such that it may be prevented that the left-eye image and the right-eye image are displayed together and arrive to both eyes. Thereby, the crosstalk may not be generated.

In addition, in the exemplary embodiment of FIG. 6, an emission duty may be controlled corresponding to the scan driving of the high speed. Referring to FIG. 6, in the stereoscopic image display device, the emission duty may be controlled for a delay period P20 to be further included between the light emitting periods of the image display period light-emitting according to the vertical synchronization signal VS and the left eye image data signal or the right eye image data signal.

The emission duty may be adjusted by controlling the on/off driving of the light emission control signal according to the shutter reaction speed of the shutter spectacles.

In the shutter spectacles in which the left eye unit and the right eye unit are opened/closed corresponding to the shutter synchronization signal SS, the shutter reaction speed of the shutter spectacles may be various and the light emitting driving of the display panel may be controlled according to the shutter reaction speed.

In the exemplary embodiment of FIG. 6, the shutter synchronization signal SS may be transited from the low level to the high level at the time t1 at which the left-eye image display period LI is finished, and may be transited from the high level to the low level at the time at which the right-eye image display period RI is finished.

The opening/closing of the left eye glass shutter LS or the right eye glass shutter RS may be started in synchronization with the transition time of the shutter synchronization signal SS.

The left eye glass shutter LS may be changed from the high level to the low level at the transition time t1 of the shutter synchronization signal SS, and may be closed during the period P10. On the other hand, the right eye glass shutter RS may be changed from the low level to the high level at the transition time t1 of the shutter synchronization signal SS, and may be opened during the period P20 including the period P10 and sustained to the time t3. The transition speed of the right eye glass shutter RS, that is, the opening speed of the right eye glass shutter RS, may be slower than the transition speed of the left eye glass shutter LS, that is, the closing speed of the left eye glass shutter LS. The right eye unit of the shutter spectacles may be opened during the periods P10 and P20.

Accordingly, the left eye unit of the shutter spectacles may be closed relatively faster than the right eye unit and the right eye unit of the shutter spectacles may be opened relatively slower than that. As such the delay period in which the light is not emitted may be provided by the period P20 between the time t2 at which the vertical synchronization signal VS is transmitted to start the right-eye image display period RI and the time t3 at which the light is emitted according to the right eye image data signal and then the right-eye image is displayed. This delay period is predetermined as a predetermined period, and is not limited. The delay period may be determined in the range of about 0.5 to about 2.5 ms.

The delay period P20 may be predetermined as an initial predetermined period in the period in which the left-eye image or the right-eye image is displayed.

According to an exemplary embodiment, each organic light emitting diode (OLED) of a plurality of pixels 10 included in the display unit 10 may not emit corresponding to the light emission control signal having the gate off voltage level during the delay period, and then may be light-emitted with the driving current according to the left eye or the right eye image data signal corresponding to the light emission control signal having the gate on voltage level from the time that the delay period P20 is finished.

The lower portion of the left-eye image and the upper portion of the right-eye image may not be displayed together in time and recognized together because of the delay period P20. Accordingly, the left-eye image and the right-eye image may be further completely divided, thereby minimizing, reducing, and/or preventing the crosstalk.

In the case of the low speed 3D driving forming one frame made of two sub-frames emitting the left-eye image and the right-eye image, the emission duty of the light emission control signal may be adjusted during a predetermined period in which the left eye glass shutter or the right eye glass shutter is stabilized directly before the left-eye image or the right-eye image is displayed, e.g., after the vertical synchronization signal VS is transmitted as a non-light emitting period (an emission off). Accordingly, the mixture of the left-eye image and the right-eye image may be completely minimized, reduced, and/or prevented. In the case of the exemplary embodiment, the driving speed may be decreased such that a display device of high quality improved with EMI, power consumption, noise may be provided.

By way of summation and review, among the flat panel displays, the organic light emitting diode display, which may display images by using an organic light emitting diode (OLED) that generates light by recombining electrons and holes, has a fast response speed, is driven with low power consumption, and has excellent emission efficiency, luminance, and viewing angle. A plurality of pixels emitting light in the organic light emitting diode (OLED) display may include the organic light emitting diode (OLED), and the organic light emitting diode (OLED) may generate light of a predetermined luminance corresponding to a data current supplied from a pixel circuit.

Digital driving as one among various expression methods of grayscales of the organic light emitting diode (OLED) display, may control the time that the organic light emitting diode (OLED) of the pixel is turned on. In the case of the organic light emitting diode (OLED) display according to the digital driving, one frame may be divided into a plurality of sub-frames, and a light emitting period of each sub-frame may be appropriately determined for grayscale display. Among the plurality of sub-frames of one frame, the pixel may emit light during a sub-frame selected according to a video signal for the expression of grayscales.

To display a stereoscopic image, at least two images corresponding to at least two different viewing points may be displayed during one frame display period. In general, a stereoscopic image display device may display a left-eye image and a right-eye image corresponding to two eyes, that is, a left eye and a right eye, in one frame period. The period of one frame may be divided into a left-eye image period and a right-eye image period. The period of one frame may include a left-eye image display period displaying the left-eye image in the left-eye image period and a right-eye image display period displaying the right-eye image in the right-eye image period.

According to a field sequential driving method, the display panel may be sequentially scanned from an upper side to a lower side such that crosstalk of a left-eye image and a right-eye image may be generated. To reduce cross-talk, when the left-eye image display period and the right-eye image display period are finished, the left-eye image period and the right-eye image period may include a black image display period for displaying a black image over the entire organic light emitting diode (OLED) display.

Notwithstanding, the crosstalk in which the left-eye image and the right-eye image are displayed together may still be present. Also, the luminance may be deteriorated by the black image that is inserted to improve the crosstalk, as such the expression of grayscales according to the original image data signal may be difficult.

Accordingly, for the realization of the 3D stereoscopic image, research for a clear stereoscopic image display device with high image quality, and a driving method thereof, that is capable of completely improving the crosstalk and simultaneously compensating the luminance that is deteriorated by the insertion of the black image is needed.

Embodiments relate to a driving method for driving a stereoscopic video signal for a clear 3D stereoscopic image to be displayed with high image quality in a display device realizing a stereoscopic image through, e.g., a field sequential driving method.

Embodiments may include a driving method of a stereoscopic image display device that is capable of substantially, e.g., completely, removing the crosstalk and simultaneously reducing the luminance loss in a display device using a field sequential driving method. Also, in embodiments, luminance loss that may be generated in the process of solving the crosstalk may be compensated such that the stereoscopic image of a clear and high quality may be provided.

Embodiments include a 3D stereoscopic image display device that may realize clear 3D image quality by removing the crosstalk of the left-eye image and the right-eye image and maximally compensating luminance deterioration caused by the insertion of the black image.

Embodiments are not limited to the above-mentioned advantages, and therefore other advantages can be clearly understood by those skilled in the art to which the embodiments pertains from the above description.

While this invention has been described in connection with what is presently considered to be practical exemplary embodiments, it is to be understood that the invention is not limited to the disclosed embodiments. But, on the contrary, this invention is intended to cover various modifications and equivalent arrangements included within the spirit and scope of the appended claims. Further, the materials of the components described in the specification may be selectively substituted by various known materials by those skilled in the art. In addition, some of the components described in the specification may be omitted without deterioration of performance or added in order to improve the performance by those skilled in the art. Moreover, the sequence of the steps of the method described in the specification may be changed depending on a process environment or equipment by those skilled in the art. Accordingly, the scope of the present invention should be determined not by the above-mentioned exemplary embodiments, but by the appended claims and the equivalents thereto.

What is claimed is:

1. A stereoscopic image display device, comprising:
a scan driver that transmits a plurality of scan signals to a plurality of scan lines;
a data driver that transmits a plurality of data signals to a plurality of data lines;
a light emission control driver that transmits a plurality of light emission control signals to a plurality of light emission control lines;
a display including a plurality of pixels connected to a corresponding scan line of the plurality of scan lines, a corresponding data line of the plurality of data lines, and a corresponding light emission control line of the plurality of light emission control lines, the plurality of pixels having transmitted thereto a corresponding data signal when a corresponding scan signal is transmitted thereto; and
a controller that controls the scan driver, the data driver, and the light emission control driver, that generates image data signals corresponding to a left-eye image display period, a right-eye image display period, a black image display period after each of the left-eye image display period and the right-eye image display period during one frame, and a shutter stabilization period during the black image display period, and that supplies the image data signals to the data driver,
wherein the black image display period in which a black image according to a black data signal is displayed and the shutter stabilization period in which a left eye glass and a right eye glass of shutter spectacles are opened/closed overlap each other between the left-eye image display period and the right-eye image display period,
wherein a shutter synchronization signal is to open a right eye of the shutter spectacles in the shutter stabilization period after the left-eye image display period,
wherein the shutter synchronization signal is to open a left eye of the shutter spectacles in the shutter stabilization period the right-eye image display period, wherein the shutter stabilization period is between a start time and an end time of the black image display period,
wherein the shutter stabilization period is less than the black image display period,
wherein a duty ratio of the plurality of light emission control signals is adjusted according to a shutter reaction speed of the shutter spectacles,
the controller is to generate a vertical synchronization signal and the shutter synchronization signal,
the vertical synchronization signal divides each frame into equal four sub-frames of the left-eye image display period, a first black image display period, the right-eye image display period, and a second black image display period, and
the shutter synchronization signal activates the shutter stabilization period, a logic level of the shutter synchronization signal to change after a start of a sub-frame of each of the first and second black image display periods but before an end of the respective black image display period.

2. The stereoscopic image display device of claim 1, wherein no image is displayed in the shutter stabilization period, each black image display period overlapping an entire corresponding shutter stabilization period.

3. The stereoscopic image display device of claim 1, wherein the shutter stabilization period overlaps a period in which light emitting of the display is off among the black image display period and the left-eye image display period or the right-eye image display period.

4. The stereoscopic image display device of claim 3, wherein the shutter stabilization period is a period in which the opening/closing of the left eye glass and the right eye glass of the shutter spectacles are intersected, and an opening speed of the shutter spectacles is slower than a closing speed of the shutter spectacles.

5. The stereoscopic image display device of claim 3, wherein the period in which light emitting of the display is off corresponds with a time according to a speed difference that the left eye glass and the right eye glass of the shutter spectacles are intersected and opened/closed.

6. The stereoscopic image display device of claim 1, wherein a frequency of the plurality of scan signals of the display transmitted during the left-eye image display period and the right-eye image display period is higher than a sub-frame frequency of the left-eye image display period or the right-eye image display period.

7. The stereoscopic image display device of claim 1, wherein a frequency of the plurality of scan signals of the display transmitted during the left-eye image display period and the right-eye image display period is 1.25 times to 2 times greater than a sub-frame frequency of the left-eye image display period or the right-eye image display period.

8. The stereoscopic image display device of claim 1, wherein the black image display period is started at a time that each of the left-eye image display period and the right-eye image display period are finished, such that the shutter stabilization period starts only after each of the left-eye image display period and the right-eye image display period is finished.

9. The stereoscopic image display device of claim 1, wherein the light emission control driver generates and transmits a light emission control signal of the plurality of light emission control signals that blocks light emitting of the corresponding pixel among the plurality of pixels during a same time as a time according to a speed difference that the left eye glass and the right eye glass of the shutter spectacles are intersected and opened/closed among the left-eye image display period or the right-eye image display period.

10. The stereoscopic image display device of claim 1, wherein the plurality of light emission control signals are transmitted as a gate on voltage level in synchronization with a time that the opening/closing of the left eye glass and the right eye glass of the shutter spectacles are intersected.

11. The stereoscopic image display device of claim 1, wherein the scan driver transmits the plurality of scan signals at a higher frequency than a sub-frame frequency of the left-eye image display period or the right-eye image display period.

12. The stereoscopic image display device of claim 11, wherein the frequency of the plurality of scan signals is 1.25 times to 2 times greater than the sub-frame frequency of the left-eye image display period or the right-eye image display period.

13. A method for driving a stereoscopic image display device, the display device drives a plurality of pixels with one frame including sub-frames of a left-eye image display period, a right-eye image display period, and a black image display period inserted between the left-eye image display period and the right-eye image display period, the method comprising:

generating a left eye image data signal, a right eye image data signal, and a black image data signal corresponding to the left-eye image display period, the right-eye image display period, and the black image display period, respectively, with a sequence of the sub-frames;

controlling a plurality of pixels to emit light according to the left eye image data signal;

displaying a black image with the plurality of pixels according to the black image data signal;

controlling a shutter synchronization signal to open a right eye of shutter spectacles during display of the black image after a left-eye image display period, controlling the plurality of pixels according to emit light according to the right eye image data signal;

displaying the black image with the plurality of pixels according to the black image data signal; and controlling a shutter synchronization signal to open a left eye of the shutter spectacles during display of the black image after a right-eye image display period, wherein the black image being displayed after the light-emitting according to each of the left eye and right eye image data signal, wherein the plurality of pixels is controlled to be off during an initial predetermined period of the light-emitting according to the left eye image data signal and the right eye image data signal, wherein a period including the predetermined period and a portion of the black image display period before the predetermined period is a shutter stabilization period in which a left eye glass and a right eye glass of shutter spectacles are opened/closed, the shutter stabilization period overlapping with the black image display period, wherein the shutter stabilization period is between a start time and an end time of the black image display period, wherein the shutter stabilization period is less than the black image display period, wherein a duty ratio of the light emission control signal is adjusted according to a shutter reaction speed of the shutter spectacles, and wherein the plurality of pixels are in a non-light-emitting state corresponding to a light emission control signal controlling a switching operation of a light emission control transistor that in turn controls light emission of an organic light emitting diode (OLED) included in the plurality of pixels during the predetermined period.

14. The method of claim 13, wherein an image according to the left eye image data signal to display the left-eye image or the right eye image data signal to display the right-eye image is not displayed in the shutter stabilization period.

15. The method of claim 13, wherein the shutter stabilization period is a period in which the opening/closing of the left eye glass and the right eye glass of the shutter spectacles are intersected, and an opening speed of the shutter spectacles is slower than a closing speed of the shutter spectacles.

16. The method of claim 13, wherein the predetermined period corresponds to a time according to a speed difference that the left eye glass and the right eye glass of the shutter spectacles are intersected and are opened/closed.

17. The method of claim 13, wherein a scan speed for the plurality of pixels during the left-eye image display period and right-eye image display period is faster than a sub-frame frequency of the left-eye image display period or the right-eye image display period.

18. The method of claim 13, wherein a scan speed for the plurality of pixels during the left-eye image display period and right-eye image display period is 1.25 times to 2 times greater than a sub-frame frequency of the left-eye image display period or the right-eye image display period.

19. The method of claim 13, wherein the light emission control signal is transmitted as a gate on voltage level in synchronization with a time that the opening/closing of the left eye glass and the right eye glass of the shutter spectacles are intersected.

* * * * *